(No Model.) 2 Sheets—Sheet 2.
F. STITZEL.
SYSTEM OF CIRCUITS FOR ELECTRIC SEMAPHORES.
No. 428,970. Patented May 27, 1890.
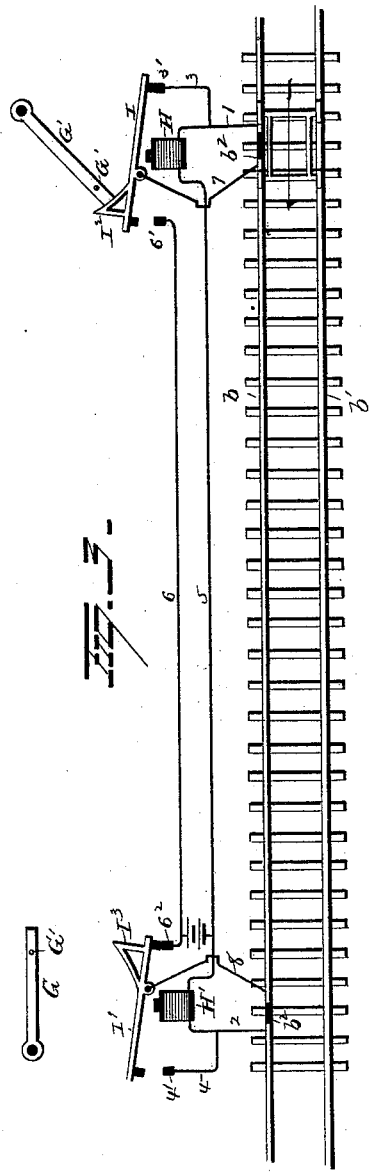
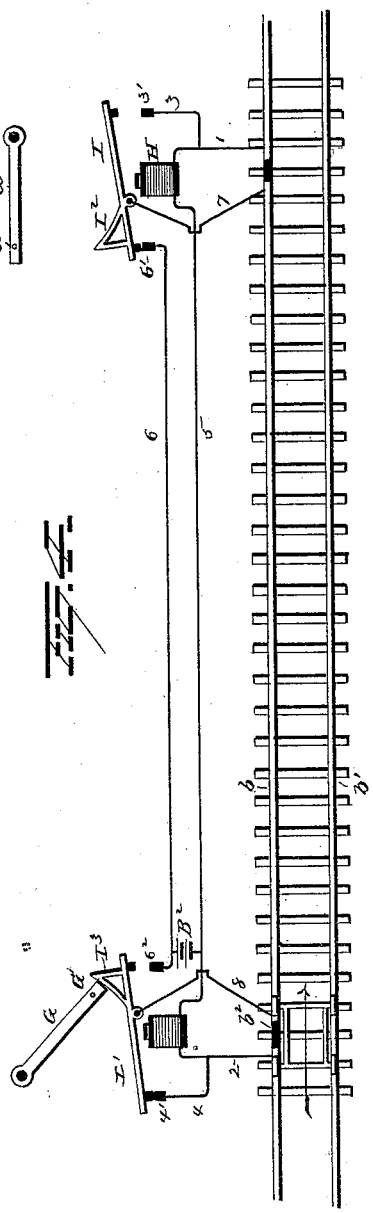
Witnesses
E. I. Nottingham
G. F. Downing.
Inventor
Frederick Stitzel
By his Attorney
H. A. Seymour

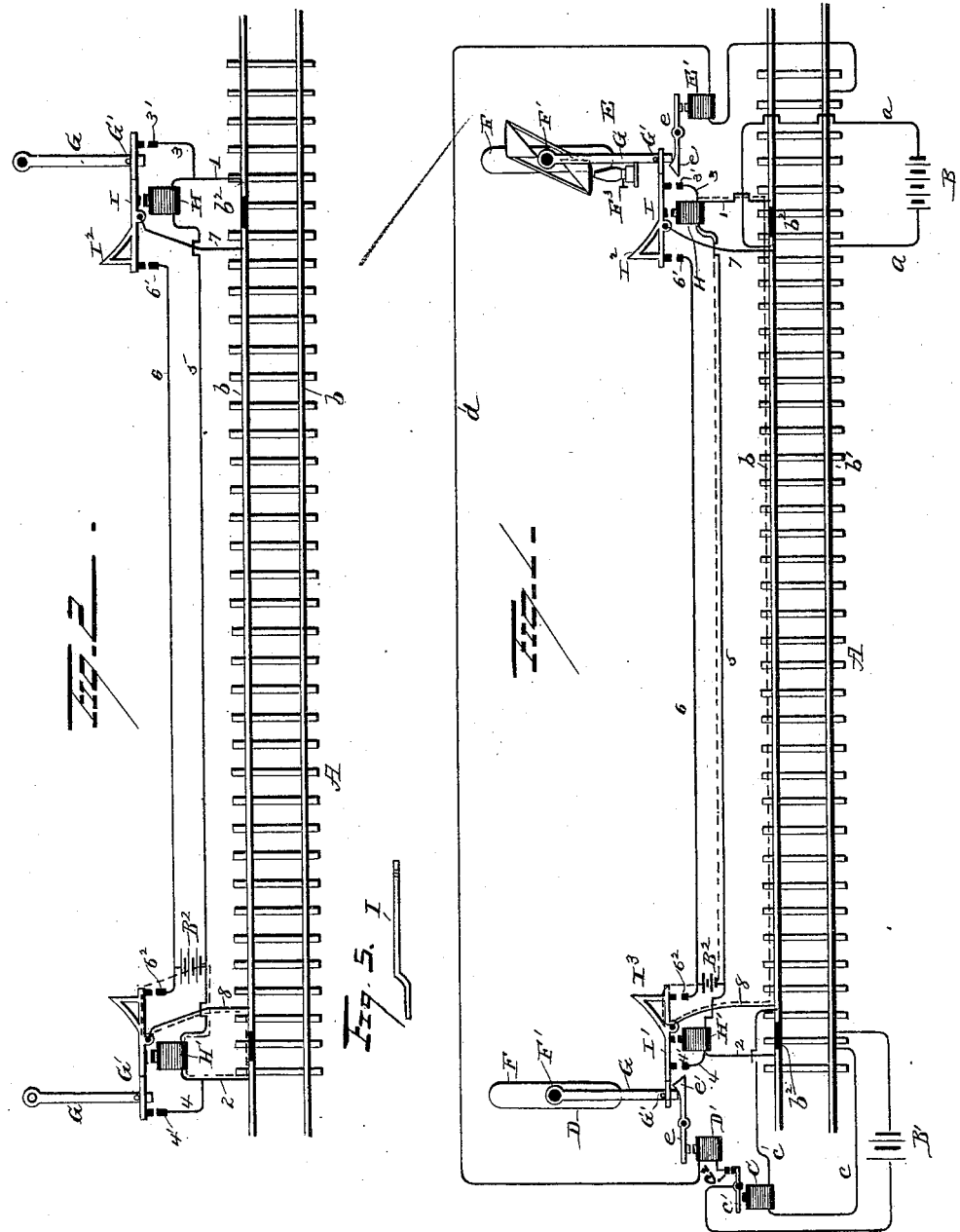

UNITED STATES PATENT OFFICE.

FREDERICK STITZEL, OF LOUISVILLE, KENTUCKY, ASSIGNOR TO THE AMERICAN SEMAPHORE COMPANY, OF SAME PLACE.

SYSTEM OF CIRCUITS FOR ELECTRIC SEMAPHORES.

SPECIFICATION forming part of Letters Patent No. 428,970, dated May 27, 1890.

Application filed February 16, 1889. Serial No. 300,093. (No model.)

*To all whom it may concern:*

Be it known that I, FREDERICK STITZEL, of Louisville, in the county of Jefferson and State of Kentucky, have invented certain new and useful Improvements in Systems of Circuits for Electric Semaphores; and I do hereby declare the following to be a full, clear, and exact description of the invention, such as will enable others skilled in the art to which it appertains to make and use the same.

My invention relates to an improvement in railroad-signals or electric semaphores, and more particularly to a system of electric circuits for controlling said instruments.

My present invention has for its object to provide semaphores at opposite ends of a block of railroad, with an arrangement of circuits by means of which the signal-blade at the entering end of the block will be turned to a position to indicate "caution," while the signal-blade at the leaving or exit end of the block will be simultaneously turned to a position to indicate "danger," said circuits being operated by a train passing over the track of the block.

A further object is to so construct the circuits which operate semaphores at opposite ends of a block that the instrument at the entering end of the block will depend for its operation upon the instrument at the leaving end of the block.

A further object is to produce a system of circuits and devices by means of which the signal-blades of semaphores at both ends of a block of railroad will be started to turn from a vertical position, the signal-blade of the semaphore at the entering end being caught when in a diagonal position, to indicate "caution," while the blade at the exit end of the block will be permitted to turn to a horizontal position, to indicate "danger."

A further object is to provide a semaphore at opposite ends of a block of railroad with a system of electric circuits of which the rails of the track form part, and devices whereby the signal-blades of both instruments are first started to turn from a vertical position. Then the blade at the entering end of the block is caught when in a diagonal position to indicate "caution," while the blade at the exit end of the block is permitted to turn to a horizontal position, designating "danger," and finally provide means whereby the signal-blade at the entering end of the block is maintained at "caution" during the occupancy of the track by a train, and after said train shall have ceased to act directly on the circuits which control the caution-signal.

A further object is to provide semaphores on a line of railroad at opposite ends of a block or section thereof, and to so construct said instruments and connect them by electrical circuits (of which the track forms part) that the signal-blade at one end of a block shall be maintained in a different position from the signal-blade at the other end, so that said signals shall indicate the direction in which the train is running and at the same time display a danger and a caution signal at the respective ends of said block.

With these objects in view my invention consists in certain novel features of construction and peculiar combinations and arrangements of circuits and devices, as hereinafter set forth, and pointed out in the claims.

In the accompanying drawings, Figure 1 is a view showing the complete system, including a single block or section of railroad, all the circuit-controllers, &c., being in their normal positions of "safety." Fig. 2 is a diagram showing the circuit which controls the cautionary signal only, with the circuit-controllers, &c., in their normal positions. Fig. 3 is a view showing the cautionary circuits, with the controllers, &c., in the position which they will assume when a train is entering the block from the right-hand end. Fig. 4 is a view showing the position of the controllers, &c., when a train is entering the block at the left-hand end. Fig. 5 is a top plan view of one of the armatures I or I'.

A represents a block or section of railroad-track the rails of which are connected at one end by wires $a\ a'$, in circuit with a battery B. The rails $b\ b'$ of each section or block are insulated from each other, and one of the rails $b$ at each end of the block is provided with an insulated portion $b^2$ for a purpose explained hereinafter. The rails of the track at the end of the block opposite the battery B are connected by wires $c$ with the ends of the helix of the magnet of a relay C. Thus it will be seen that both tracks and relay C are normally in a closed circuit with the battery B. The armature-lever $c'$ of the relay C at one end normally makes contact with a stop $c^2$, which is in turn electrically connected with one end of the helix of the semaphore-magnet $D'$ of semaphore D. The lever $c'$ is also connected with one pole of a battery $B'$, the other pole of which is connected by a suitable wire with rail $b'$ of the track. The free end of the helix of the magnet $D'$ is now connected by a wire $d$ with one end of the helix of a semaphore-magnet $E'$ of a semaphore E at the opposite end of the block, the other end of said helix being connected to the rail $b'$.

It will be seen from the above-described construction and arrangement of circuits, &c., that the main circuit extends the entire length of one block and passes around the magnet of the relay C, and that the armature-lever of the relay will be normally attracted and closes a second or return circuit, which starts from the battery $B'$ and flows through the rail $b'$ of the track to the opposite end of the block, thence around the controlling-magnet $E'$ of the semaphore E, thence by wire $d$ to semaphore D, then around controlling-magnet $D'$ of said semaphore D and finally back to the battery. The armature-levers $e\,e$ of the semaphore-magnets $D'\,E'$ will be normally attracted, and will be released when the circuit of battery $B'$ is broken by the short-circuiting of battery B by the cars.

By means of the devices hereinbefore described the signal-blades of the semaphores at both ends of a block are released through any suitable mechanism, the devices herein shown and described for releasing and stopping the signal-blade to cause it to assume positions for the purpose of imparting different information being merely shown and described as being a convenient mode of accomplishing the desired ends, and to insure a clear understanding of the functions of the several circuits embodied in this system.

In order to cause the signal-blade of the semaphore at the entrance of the block to assume a diagonal position to produce a cautionary signal, and the signal-blade at the opposite end of the block to assume a horizontal position to indicate "danger," the operation of one semaphore being controlled by that of the other, a system of circuits and devices will be arranged in the manner now to be described.

A semaphore at each end of the block is constructed having a signal-blade F fixed on a shaft $F'$, journaled in a suitable frame-work. The shaft $F'$ may carry a thermo-motor adapted to be heated by a lamp $F^3$, and the remaining mechanism constructed and arranged as shown and described in Letters Patent No. 393,865, issued to myself and Charles Weinedel on the 4th day of December, 1888, whereby the shaft carrying the signal-blade, &c., may be partially rotated, first in one direction from a position of "safety," and then in the opposite direction to return the blade to a position of "safety" after the train has left the block. It is evident, however, that any other preferred construction of motor for turning the signal-blade from a position indicating "safety" and returning it to "safety" when permitted by the operation of the circuits may be adopted. An arm G projects from the shaft of each semaphore and extends downwardly in a line with the vertical axis of the signal-blade F. The arm G of each semaphore is maintained in a normally-vertical position by contact of its free end with a projection $e'$ on one end of each armature-lever $e$. Therefore when the circuit of semaphore-magnets $D'\,E'$ is opened the arm G will be released; but when said circuit is made through these magnets the latter will maintain the lever $e$ in contact with the arm G.

Each semaphore is furnished with an electro-magnet H H', respectively. Armature-levers I I' are pivoted in proximity to the poles of these magnets and provided on the end farthest from the magnets with cam projections $I^2\,I^3$. These cam projections are so proportioned and arranged that when the armature-levers are attracted by the magnets H H' they will be in the path of the arms G as said arms describe the arc of a circle; but when said armatures I I' are released the projections $I^2\,I^3$ will be out of the path of the arm G. One end of the armature-levers $I^2\,I^3$ is bent slightly laterally and then extended rearwardly, as shown in Fig. 5, and made to normally bear against a pin $G'$, projecting from the arm G for a purpose presently explained. One end of the helix of each magnet H H' is connected by wires 1 2 with the rail $b$ at points outside of or beyond the insulated portion $b^2$. Branch wires 3 4 extend upwardly from the wires 1 2 in proximity to the armature-levers I I', and are provided at their upper ends with contact-points $3'\,4'$. The other ends of the helices of the magnets H H' of the two semaphores are united by a line-wire 5. Another line-wire 6 extends from one semaphore to the other, and is provided on each end with a contact-point $6'\,6^2$, with which the levers I I' are adapted to make contact. The armature-levers I I' are now connected, preferably from points near their center, with the rail $b$ at a point inside the insulated portion $b^2$ by means of wires 7 8. This insulated portion $b^2$ of the track is of such length that the first set of wheels of the train will bridge it and complete an electrical circuit, as hereinafter explained. A battery $B^2$ is interposed between the line-wires 5 6 at one end of the block, and has its respective poles connected with said wires.

The circuits, circuit-controllers, &c., being arranged as above set forth, the operation of the system is as follows: A train entering the block of railroad from either end short-circuits the battery B, and thus demagnetizes the electro-magnet of relay C. The armature-lever of the relay will then break the circuit of battery B' and demagnetize the semaphore-magnets D' E'. The armature-levers e will then fall and the projections e' on said levers will move out of the path of the arm G. The arm G, being thus released, will begin to move from a vertical position, being propelled by its thermal or other motor. The remaining circuits—that is, the circuits which control the cautionary signal—are normally open and all contacts broken, as most clearly shown in Fig. 2, being held in that condition by the engagement of the armature-levers I I' with the pins G' of arms G. When said arms G are released and begin to move, the pins G' move out of contact with the armature-levers I I', and thus permit the weighted ends of said levers to make contact with the contact-points 6' 6². Now, assuming that a train is entering the block from the right, as represented in Fig. 3, the wheels will bridge the insulated portion b² of the track, and the following-described circuit will be established. The current starting from battery B² will flow through contact 6² to armature-lever I', thence by wire 8 to rail b of the track. The current then flowing to the other end of the block passes through the wheels, &c., of the train, which bridges the insulated portion b², thence by wire 1 to helix of magnet H, and thence by wire 5 to battery B², this circuit being represented in Fig. 1 by dotted lines. Thus it will be seen that the bridging of the insulated portion b² by the train establishes a circuit by which magnet H is magnetized. This magnet therefore immediately attracts armature-lever I, which will bring the projection I² directly in the path of the arm G and stop said arm when it has made but one-eighth revolution, thereby maintaining the signal-blade at the entering end of the block in an oblique position, and thus produce a cautionary signal. The magnet H' at the exit end of the block will not be energized under the above-described circumstances, and consequently the arm G and signal-blade will be permitted to make a quarter-revolution and display the danger-signal.

In order to maintain the circuit of magnet H closed after the first wheels of the train have passed the insulated portion b², the armature-lever I is made to make contact with point 3'. The circuit will then be as shown in Fig. 3—that is to say, from battery B² through point 6² to armature-lever I', thence to rail b by wire 8, thence to opposite end of block, then by wire 7 to armature-lever I. From armature-lever I the current passes through point 3' and wire 3 to helix of magnet H and from opposite end of said helix back to battery B² by wire 5. Thus it will be seen that as soon as a train enters a block the signal-blades of the instruments are started to turn from a vertical or safety position, and that the blade at the entering end of the block will be caught when it has moved but one-eighth of a complete revolution to display a cautionary signal, while the blade at the exit end of the block will be permitted to make a quarter-revolution, and thereby display a danger-signal. It should also be observed that the proper operation of the instrument at one end of the block is dependent upon the proper operation of the apparatus at the other end. Therefore when a train enters a block and the engineer sees the cautionary signal has been displayed he is immediately assured that the signal at the opposite end of the block is set at "danger," for if it were not the cautionary signal could not appear. And, again, by producing a cautionary signal at one end of a block and a danger-signal at the other a person can tell in a moment which way the train occupying the block is running, because the cautionary signal is always displayed behind the train, while the danger-signal is displayed in advance of it.

The system of circuits and appliances herein set forth are equally applicable for operating the signals whichever way the train is running. Suppose a train enters the block from the left, as shown in Fig. 4, the battery B would be short-circuited and the signal-blades released, as above explained. The wheels of the train will bridge the insulated portion b² at the left-hand end of the block and establish a circuit through the magnet H', as shown in dotted lines in Fig. 2. In other words, the circuit starting from battery B² passes through 6' to lever I³, thence by wire 8 to rail b. The current then flows through wheels of the train, thence by wire 2 to helix of magnet H', and from the opposite end of said helix to battery B² by portion of wire 5. The magnet H' will be energized and caused to attract its armature I' and maintain the projection I³ of said lever in the path of the arm G, thus stopping the said arm when the shaft F' has made one-eighth of a revolution and holding the signal-blade at "caution." The blade at the opposite end of the block will fall to "danger," as the magnet H will not be energized to hold the armature-lever I in the way of the arm G, fixed to the shaft of said blade.

In order to maintain the cautionary signal in the proper position during the occupancy of the block by the train after the first set of wheels leave the insulated portion of the track, and when the train is running in the direction now under consideration, the arrangement of circuits shown in Fig. 4 will be established. The current starting from the battery B² traverses wire 6 to point 6', thence through armature-lever I to rail b. The current then flows to the opposite end of the block, thence by wire 8 to armature-lever I', from said lever through contact 4' and wire 4 to the helix of magnet H', and from the opposite end of said helix to battery B² by means of a portion of wire 5. Whichever way the train is running the apparatus at one end of a block depends upon the operation of the apparatus at the other end of the block. Therefore when an engineer sees that the signal at the entering end of the block is not properly set he knows that the signal at the exit end is not properly set and that something is the matter on the block.

It is evident that slight changes might be made in the constructive details of my invention without departing from the spirit thereof or limiting its scope. Hence I do not wish to limit myself to the precise details of construction herein described; but, Having fully described my invention, what I claim as new, and desire to secure by Letters Patent, is—

1. The combination, with a railroad block or section, a semaphore at each end of said block or section, each semaphore constructed to be normally set at "safety" and adapted to be set at "caution" and "danger," and electric circuits of which the track forms a part thereof, of electro-magnetic devices connected and combined with each semaphore and adapted to be automatically actuated by a train running onto and off from said block, said devices being constructed and adapted to automatically and simultaneously set the semaphore at the entrance of the block to "caution" and the semaphore at the exit of the block to "danger" upon the passage of a train onto the block in either direction, and to automatically and simultaneously set both semaphores to "safety" when the train leaves the block, substantially as set forth.

2. The combination, with a railroad block or section, a semaphore at each end of said block or section, each semaphore constructed to be normally set at "safety," electrically-actuated devices for releasing both semaphores simultaneously, and electric circuits of which the track forms a part thereof, of electro-magnetic devices combined with each semaphore and connected by suitable electric circuits, and circuit-shifters included in said electric circuits, whereby when a train enters the block in either direction both signals will be released, and the circuit-shifters of the semaphore at the exit end of the block will be actuated to shift the circuits and cause the electro-magnetic devices of the semaphore at the entrance of the block to be energized to limit the movement of said semaphore and cause it to indicate "caution," substantially as set forth.

3. The combination, with a block of railway, of a semaphore at each end thereof, each semaphore having an arm connected with the signal-blade, pivoted levers having projections for engaging said arms, electro-magnets in closed electrical circuit with the track of the block for controlling the operation of the pivoted levers, a second lever in each instrument having a projection, electro-magnets for controlling the operation of the latter-named levers, and electrical circuits including said magnets and the track, whereby the last-mentioned levers will be operated to arrest the signal-blade of the semaphore at the entering end of the block to produce a cautionary signal, substantially as set forth.

4. The combination, with a block of railroad and a semaphore at each end thereof, of normally-closed electrical circuits, including the rails of the track, conducting-wires, and the main semaphore-magnets of both semaphores, a second normally-open circuit, including a second set of semaphore-magnets, and devices for holding said second circuit normally open and automatically closing it, substantially as set forth.

5. The combination, with a block of railroad and a semaphore at each end thereof, of normally-closed electrical circuits, including the rails of the track, conducting-wires, and main semaphore-magnets of both semaphores, a second normally-open circuit, including a second set of semaphore-magnets, and electrically-actuated devices for closing said open circuit.

In testimony whereof I have signed this specification in the presence of two subscribing witnesses.

FREDERICK STITZEL.

Witnesses:
R. S. FERGUSON,
G. F. DOWNING.